United States Patent
Nezou et al.

(10) Patent No.: US 12,127,277 B2
(45) Date of Patent: Oct. 22, 2024

(54) DIRECT LINK AND DOWNLINK TRANSMISSIONS IN TRIGGER-BASED MULTI-USER TRANSMISSIONS

(71) Applicant: CANON KABUSHIKI KAISHA, Tokyo (JP)

(72) Inventors: Patrice Nezou, Liffré (FR); Stéphane Baron, Le Rheu (FR); Julien Sevin, Saint Aubin du Cormier (FR); Pascal Viger, Janze (FR)

(73) Assignee: Canon Kabushiki Kaisha, Tokyo (JP)

( * ) Notice: Subject to any disclaimer, the term of this patent is extended or adjusted under 35 U.S.C. 154(b) by 807 days.

(21) Appl. No.: 17/257,257

(22) PCT Filed: Jul. 5, 2019

(86) PCT No.: PCT/EP2019/068139
§ 371 (c)(1),
(2) Date: Dec. 30, 2020

(87) PCT Pub. No.: WO2020/008049
PCT Pub. Date: Jan. 9, 2020

(65) Prior Publication Data
US 2021/0368561 A1    Nov. 25, 2021

(30) Foreign Application Priority Data
Jul. 6, 2018  (GB) ..................... 1811176

(51) Int. Cl.
*H04W 76/14*   (2018.01)
*H04W 76/15*   (2018.01)
*H04W 84/12*   (2009.01)

(52) U.S. Cl.
CPC ........... *H04W 76/14* (2018.02); *H04W 76/15* (2018.02); *H04W 84/12* (2013.01)

(58) Field of Classification Search
CPC ...... H04W 72/23; H04W 76/14; H04W 76/15
See application file for complete search history.

(56) References Cited

U.S. PATENT DOCUMENTS

2012/0327915 A1   12/2012  Kang
2016/0119933 A1*   4/2016  Merlin ............... H04L 27/2613
                                                 370/312
(Continued)

FOREIGN PATENT DOCUMENTS

CN    107006007 A    8/2017
CN    108029143 A    5/2018
(Continued)

OTHER PUBLICATIONS

Deng, Der-Jiunn et al, "IEEE 802.11ax: Highly Efficient WLANs for Intelligent Information Infrastructure", IEEE Communications Magazine, IEEE Service Center, vol. 55, No. 12, Dec. 2017, pp. 52-59, NJ, US.
(Continued)

*Primary Examiner* — Yee F Lam
(74) *Attorney, Agent, or Firm* — Canon U.S.A., Inc. IP Division

(57) ABSTRACT

Aspects of the present disclosure generally relate to enhanced multi-user (MU) uplink (UL) protocols in wireless networks that allow non-UL transmissions to be performed simultaneously with triggered MU UL transmissions. A station may send a trigger frame triggering MU transmissions with an appropriate signaling to allow non-UL transmissions, i.e. transmission to another station, in a resource unit of the MU transmission. Examples of non-UL transmissions include Direct Link transmissions as well as downlink (DL) transmissions.

22 Claims, 8 Drawing Sheets

(56) References Cited

U.S. PATENT DOCUMENTS

| | | | |
|---|---|---|---|
| 2016/0174200 A1* | 6/2016 | Seok | H04L 5/0092 |
| | | | 370/329 |
| 2016/0198445 A1 | 7/2016 | Ghosh et al. | |
| 2016/0249397 A1* | 8/2016 | Seok | H04L 1/0075 |
| 2017/0079027 A1 | 3/2017 | Chun | |
| 2017/0181102 A1* | 6/2017 | Bharadwaj | H04W 52/242 |
| 2017/0245306 A1* | 8/2017 | Kim | H04W 72/21 |
| 2018/0176929 A1* | 6/2018 | Ryu | H04W 72/56 |
| 2018/0184409 A1 | 6/2018 | Min | |
| 2018/0242355 A1 | 8/2018 | Lou et al. | |
| 2018/0292518 A1* | 10/2018 | Chu | H04W 72/121 |
| 2018/0338325 A1* | 11/2018 | Ryu | H04W 72/23 |
| 2019/0014491 A1* | 1/2019 | Seok | H04W 12/12 |
| 2019/0021091 A1* | 1/2019 | Ko | H04W 74/002 |
| 2019/0124556 A1* | 4/2019 | Verma | H04W 28/26 |
| 2019/0132724 A1* | 5/2019 | Asterjadhi | H04W 48/10 |
| 2019/0349067 A1* | 11/2019 | Huang | H04W 72/046 |
| 2019/0387549 A1* | 12/2019 | Iwai | H04L 5/0053 |
| 2020/0008210 A1* | 1/2020 | Li | H04W 72/23 |
| 2020/0014599 A1* | 1/2020 | Asterjadhi | H04W 72/21 |
| 2021/0028917 A1* | 1/2021 | Park | H04W 72/23 |
| 2021/0195622 A1* | 6/2021 | Kim | H04W 72/0453 |

FOREIGN PATENT DOCUMENTS

| | | |
|---|---|---|
| GB | 2552200 A | 1/2018 |
| WO | 2016/176595 A1 | 11/2016 |

OTHER PUBLICATIONS

Patil, Abhishek (Qualcomm Inc.); "Proposed resolution for comments related to CIDs in 27.5.2"; IEEE P802.11 Wireless LANs; May 3, 2017; pp. 1-18.

Wireless LAN Medium Access Control (MAC) and Physical Layer (PHY) Specifications; IEEE Standard for Information technology-Telecommunications and information exchange between systems Local and metropolitan area networks-Specific requirements; IEEE Std 802.11TM-2016, Dec. 2016.

* cited by examiner

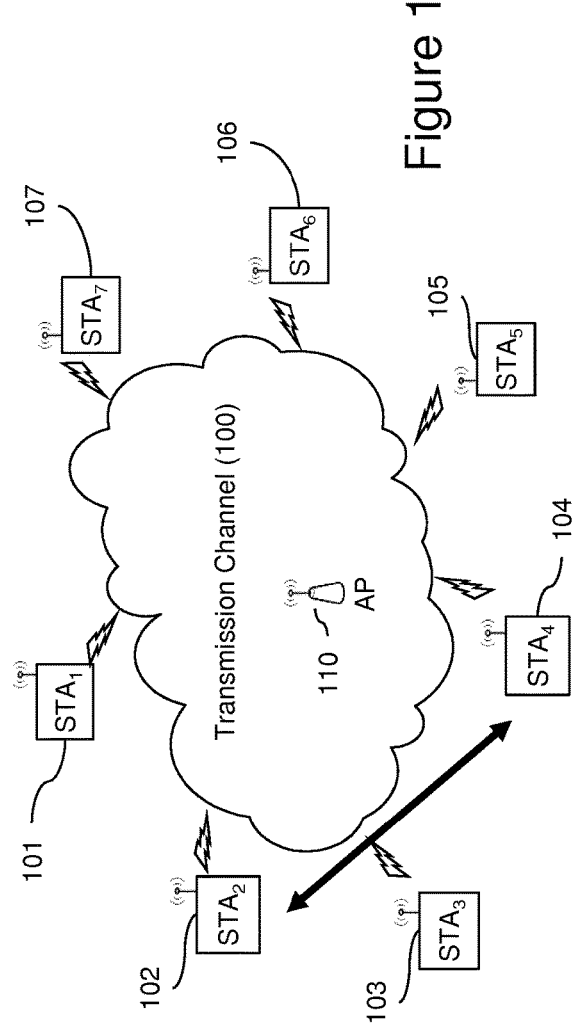
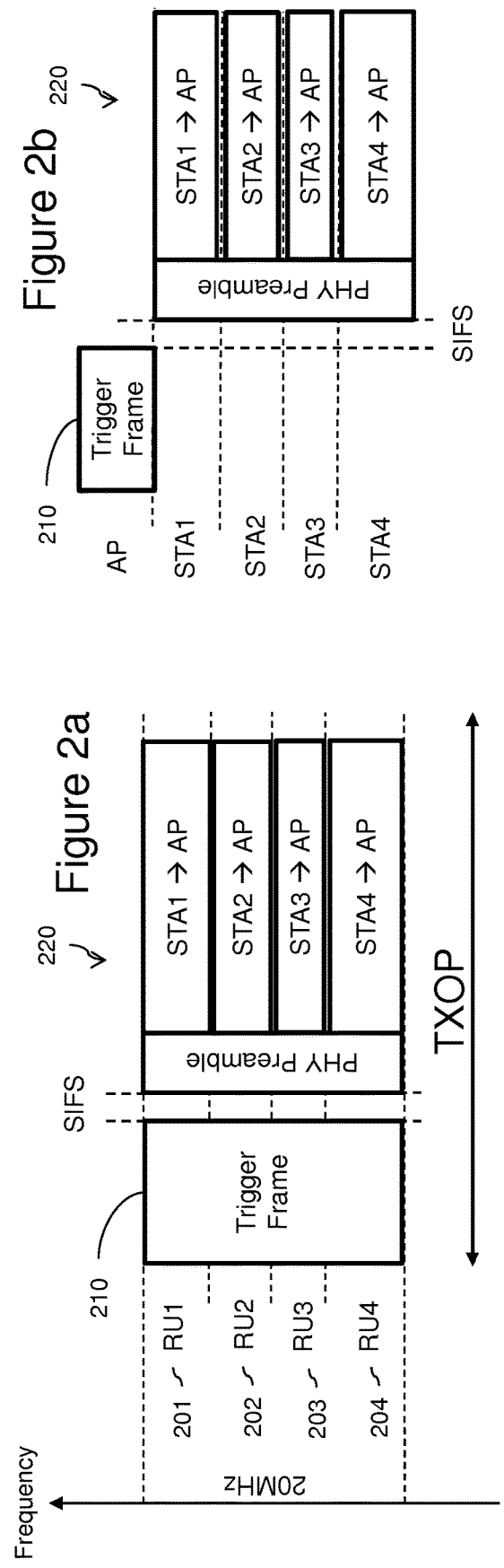

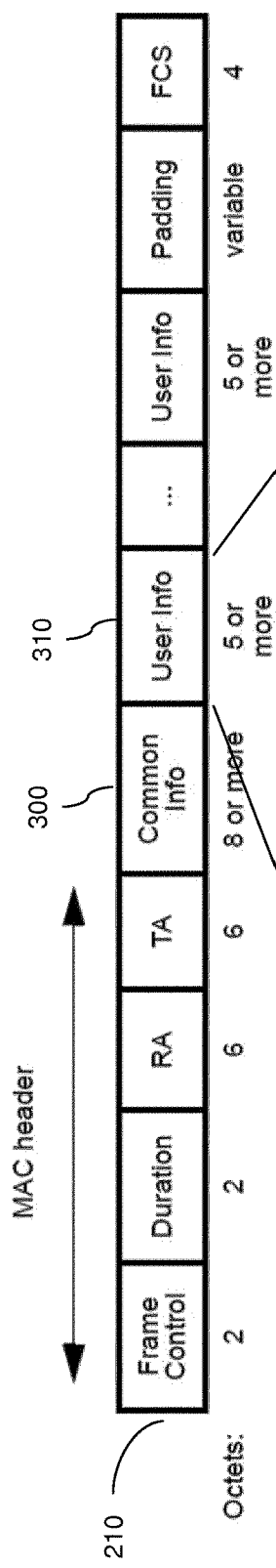
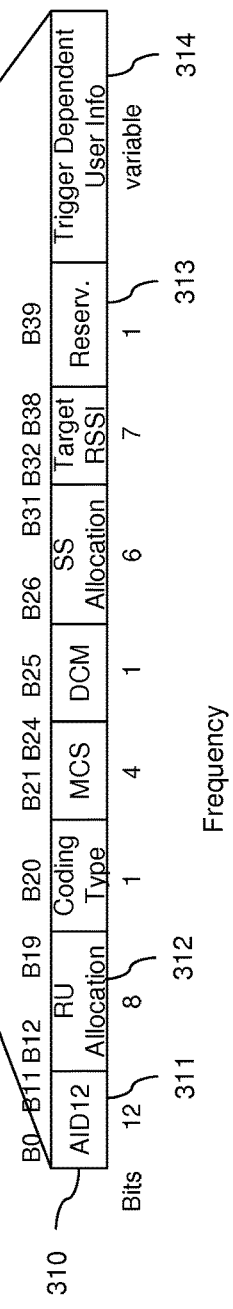
Figure 3
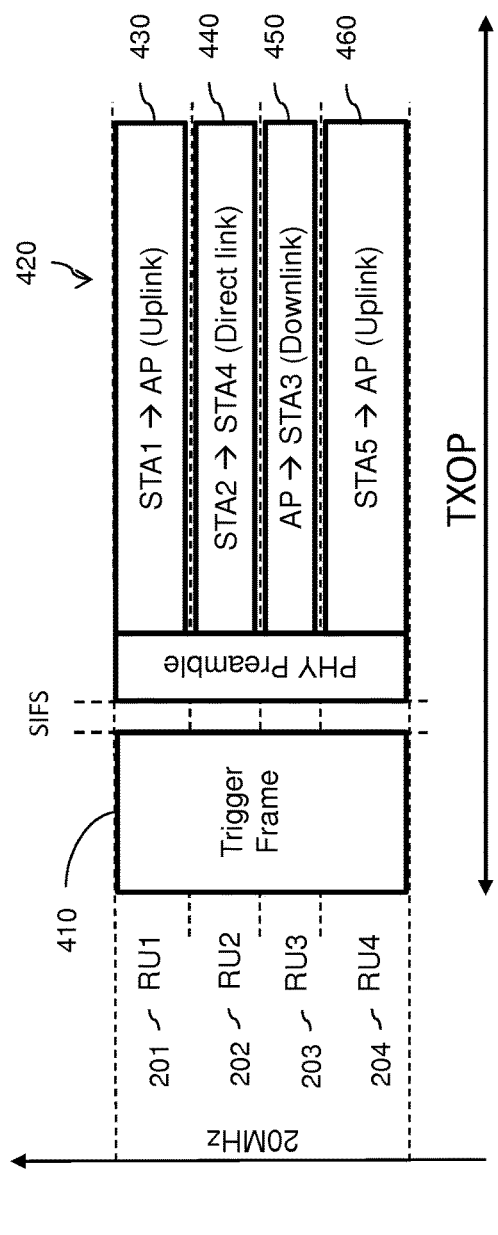
Figure 4

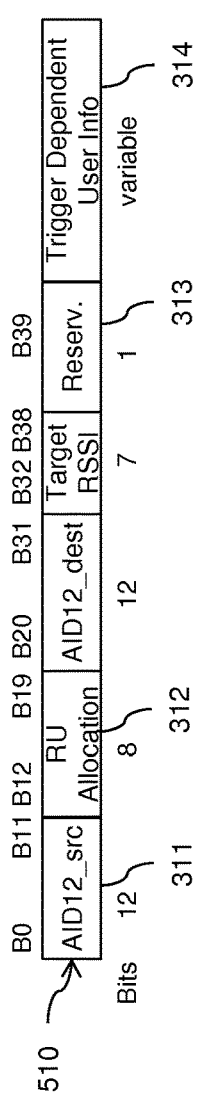
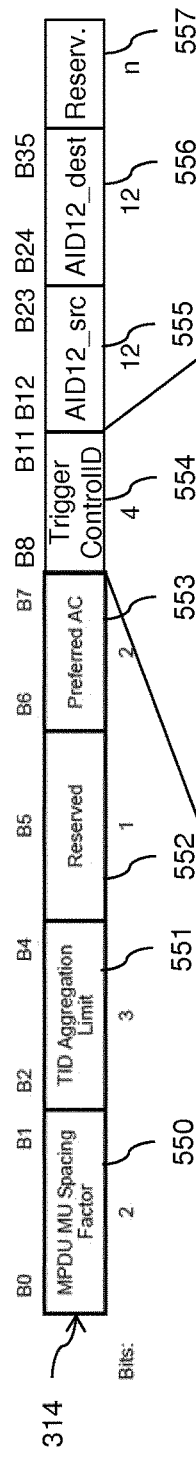
Figure 5a
Figure 5b
Figure 5d

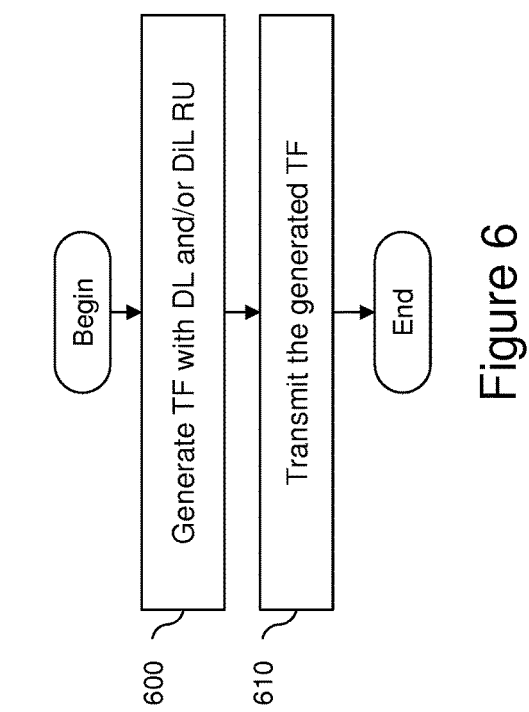

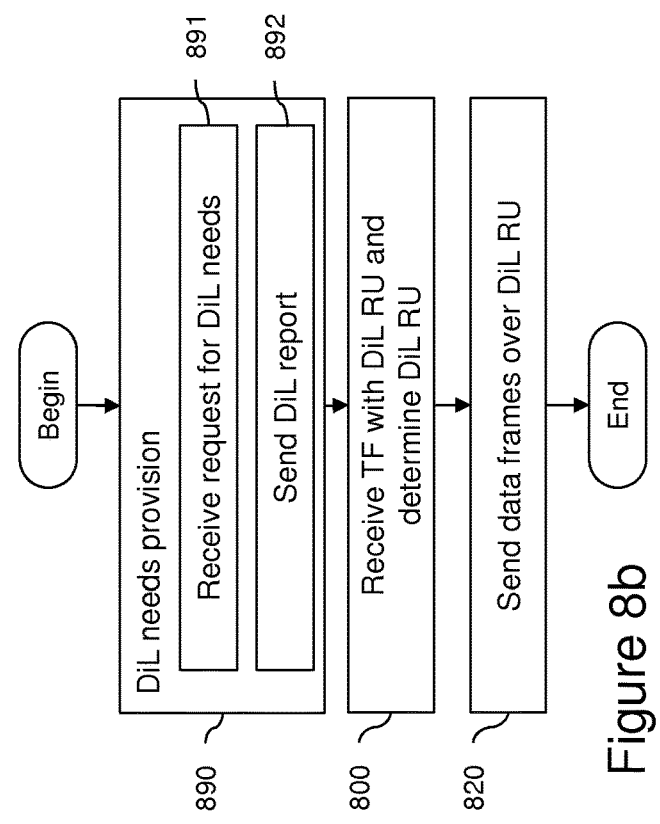
Figure 8
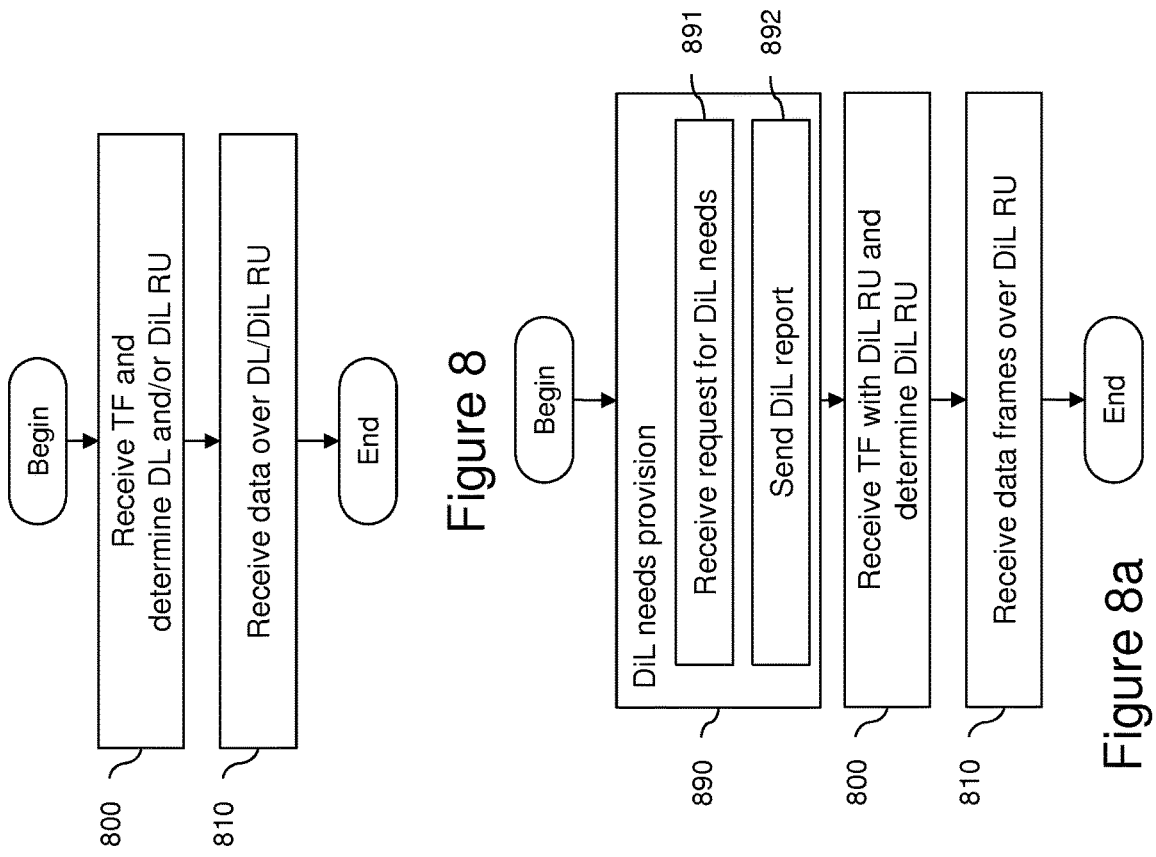
Figure 8a
Figure 8b

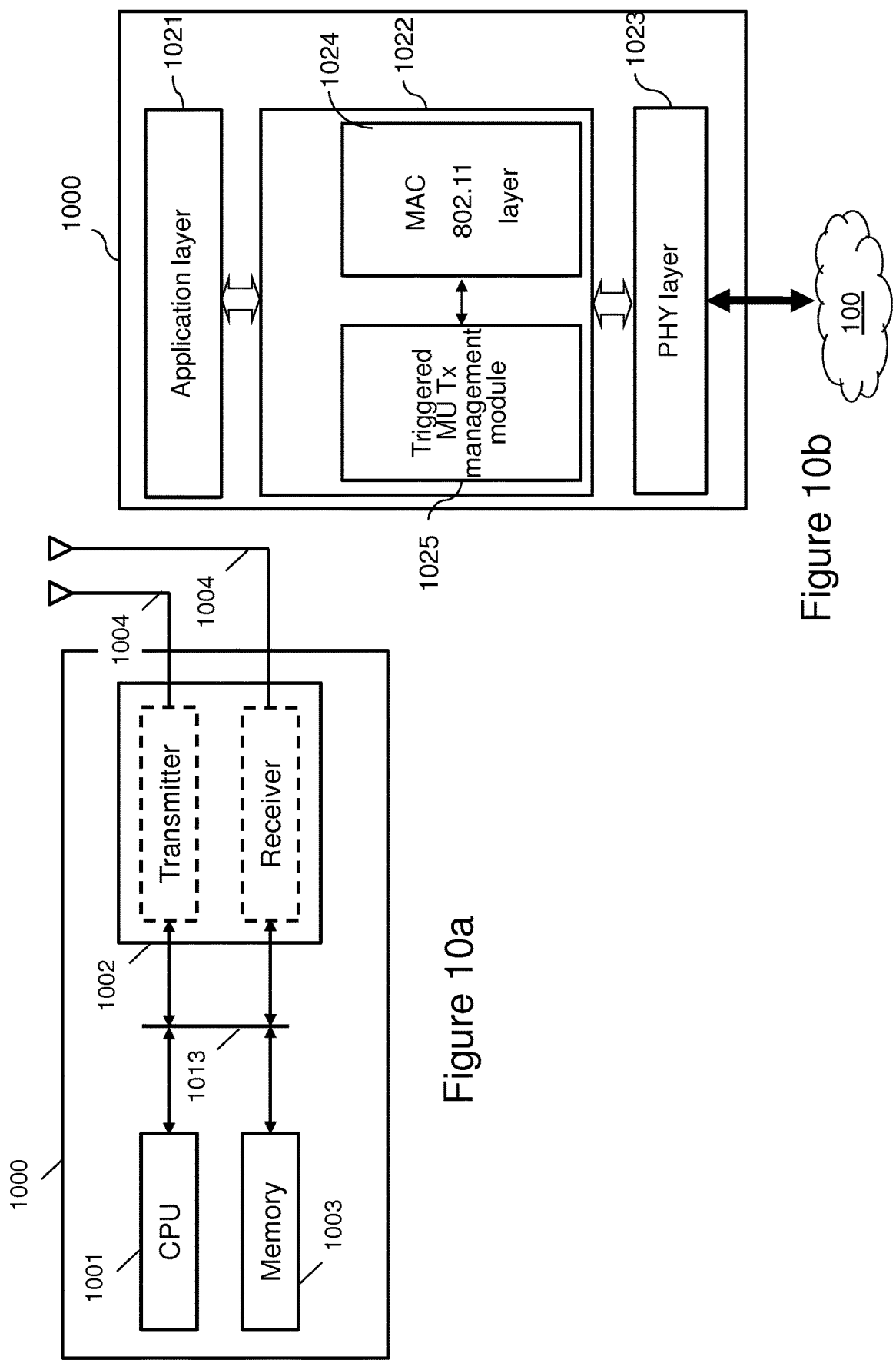

DIRECT LINK AND DOWNLINK TRANSMISSIONS IN TRIGGER-BASED MULTI-USER TRANSMISSIONS

CROSS REFERENCE TO RELATED APPLICATION

This application claims the benefit under 35 U.S.C. § 119(a)-(d) of United Kingdom Patent Application No. 1811176.5, filed on Jul. 6, 2018 and entitled "DIRECT LINK AND DOWNLINK TRANSMISSIONS IN TRIGGER-BASED MULTI-USER TRANSMISSIONS." The above cited patent application is incorporated herein by reference in its entirety.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth and decreasing latency requirements that are demanded for wireless communications systems in high-density environments, multi-user (MU) schemes are being developed to allow a single access point (AP) to schedule MU transmissions, i.e. multiple simultaneous transmissions to or from non-AP stations, in the wireless network. For example, one of such MU schemes has been adopted by the Institute of Electrical and Electronics Engineers (IEEE) in the 802.11ax standard.

Thanks to the MU feature, a station has the opportunity to gain access to the wireless medium via two access schemes: the MU scheme and the conventional Enhanced Distributed Channel Access—EDCA (Single User) scheme.

The 802.11ax standard allows a MU downlink (DL) transmission to be performed by the AP where the latter can perform multiple simultaneous elementary transmissions, over so-called resource units (RUs), to various non-AP stations. As an example, the resource units split a communication channel of the wireless network in the frequency domain, based for instance on Orthogonal Frequency Division Multiple Access (OFDMA) technique.

The 802.11ax standard also allows a MU uplink (UL) transmission to be triggered by the AP, where various non-AP stations can simultaneously transmit to the AP over the resource units forming the MU UL transmission. To control the MU UL transmission by the non-AP stations, the AP sends a control frame, known as a Trigger Frame (TF), by which it allocates the resource units to the non-AP stations using 16-bit Association IDentifiers (AIDs) assigned to them upon registration to the AP and/or using reserved AIDs designating a group of non-AP stations.

The adopted 802.11 MU transmission scheme is not adapted to bandwidth-demanding communication services, e.g. video-based services such as gaming, virtual reality, streaming applications. This is because all the communications go through the AP, thereby doubling the air time for transmission but also the number of medium accesses (and thus of medium access time).

The Single User (SU) scheme of 802.11ax allows a direct link (DiL) to be performed wherein the data (MAC) frames are addressed using the 48-bit IEEE MAC address of the destination station. However, SU and MU schemes directly compete one against the other to gain access to the wireless medium (by the AP for MU schemes, by a non-AP station for the SU scheme). In high density environments, this competition generates a large amount of undesirable collisions, thereby degrading latency and overall useful data throughput.

More generally, 802.11ax is seen as not being adapted to direct link transmissions and MU transmissions can be improved.

SUMMARY OF INVENTION

It is a broad objective of the present invention to improve this situation.

In order to take advantage of the high benefits of the transmission scheduling made by the AP in high density environments, the inventors have contemplated integrating the direct link in the global policy of the AP's scheduling. This raises some challenges.

One of these challenges and aspects of the present disclosure generally relate to how integrate a direct link within the 802.11ax MU schemes and efficiently signal it.

Certain aspects of the present disclosure provide a method for wireless communication comprising, at a triggering station, usually an access point, AP:

generating a trigger frame to trigger a multi-user, MU, transmission, and sending the trigger frame to triggered stations (different from the triggering station), usually non-AP stations, wherein the trigger frame allocates a resource unit of the MU transmission for direct link transmission between a source triggered station and a destination triggered station, usually a destination non-AP station.

Preferred implementation is when the triggering station is an AP and the triggered stations are non-AP stations (stations having registered to the AP).

This approach dedicates one or more RUs usually provided for MU UL transmissions (i.e. transmissions to the AP), to DiL transmissions between two non-AP stations thereby providing direct links without competing EDCA contention by a non-AP station, in which case the resource unit is allocated for direct link transmission between at least two triggered stations. This approach helps reducing collisions in the wireless network.

Other RUs may be provided for AP-to-station (i.e. downlink—DL) transmissions thereby providing full duplex within the same MU transmission, in which case the resource unit is allocated for downlink transmission from an access point acting as the triggering station to the destination triggered station.

DiL and/or DL transmissions are mixed up with UL transmissions within the same MU transmission thanks to the newly proposed AP scheduling. Hence, use of the wireless network is improved.

From a triggered station operating as a destination station for the DiL or DL transmission, corresponding aspects of the invention provide a method for wireless communication comprising, at a triggered station, usually a non-access-point station:

receiving, from a triggering station, usually an access point, AP, a trigger frame triggering a multi-user, MU, transmission, wherein the trigger frame allocates a resource unit of the MU transmission for direct link transmission between a source triggered station and a destination triggered station, and receiving a data frame from the source triggered station over the resource unit allocated for direct link transmission.

From a triggered station operating as a source station for a DiL transmission, corresponding aspects of the invention provide a method for wireless communication comprising, at a triggered station, usually a non-access-point station:

receiving, from a triggering station, usually an access point, AP, a trigger frame triggering a multi-user, MU, transmission, wherein the trigger frame allocates a resource unit of the MU transmission for direct link transmission to a destination triggered station different from the triggering station, usually a destination non-AP station, and sending a data frame directly to the destination triggered station using the resource unit allocated for direct link transmission.

Aspects of the invention also provide a station in a wireless network comprising a microprocessor configured for carrying out the steps of the method defined above.

Optional features of the invention are defined in the appended claims. Some of these features are explained here below with reference to a method, while they can be transposed into system features dedicated to any system according to the invention.

Regarding the Direct Link (DiL) approach, the trigger frame may indicate that the resource unit is accessible through contention by triggered stations for direct link transmission to the destination triggered station. This approach lets open the access to the RU to a number of triggered stations. This may be done by omitting indicating, in the trigger frame, an AID specific to a source non-AP station (a reserved AID such as 0 may be used in a field corresponding to the source non-AP station) or by using a specific AID (in 802.11ax AID12 field for instance) reserved to signal a random DiL RU. Conventional mechanisms (including adding a specific backoff counter) may be used to access such random DiL RU.

In a variant, the trigger frames allocate the resource unit to a specific source triggered station for direct link transmission. To do so, the AID assigned to the specific source non-AP station during association and representing the ID of the station may be specified in the trigger frame.

In some embodiments, the trigger frame indicates that the source triggered station choses the destination triggered station for direct link transmission. It means the TF does not define the destination non-AP station. It is up to the source non-AP station accessing the DiL RU to decide to which non-AP station it wishes to send data. Again, this may be done by omitting indicating, in the trigger frame, an AID specific to a destination non-AP station (a reserved AID may be used in a field corresponding to the destination non-AP station) or by using a specific AID (in AID12 field for instance) reserved to signal such DiL RU without specified destination non-AP station.

In a variant, the trigger frame identifies one or more destination triggered stations for the direct link transmission. To do so, the AID assigned to the specific destination non-AP station during association and representing the ID of the station may be specified in the trigger frame.

Regarding the Downlink (DL) approach, the trigger frame may identify one or more destination triggered stations for the downlink transmission in other resource units. To do so, the AID assigned to the specific destination non-AP station during association and representing the ID of the station may be specified in the trigger frame.

Of course, it is possible to allocate, through the same trigger frame, one or more resource units for direct link transmission between two triggered (non-AP) stations, or one or more resource units for data transmission from the triggering station (AP) to one or more target non-AP stations, or a combination thereof.

In some embodiment, the method further comprises, at the triggering station, using a downlink resource unit to send a data frame to the destination triggered station. This implements the downlink transmission.

Various signaling of DiL or DL resource units are contemplated hereafter.

In some embodiments, a field associated with the resource unit in the trigger frame includes a signaling that the resource unit is intended for data transmission to the destination triggered station. This field allows the stations to easily distinguish between the conventional UL RUs and the DiL or DL RUs in MU transmission triggered by the trigger frame.

In some embodiments, the field associated with the resource unit includes an AID12 subfield which, when including an AID assigned to a specific non-AP station during association with the AP, allocates the resource unit to the specific non-AP station for uplink transmission (to the triggering station), wherein the signaling includes setting, in the AID12 subfield, an AID value reserved to data transmission to a destination triggered station. Using such reserved AID value makes it possible for the stations receiving the trigger frame to quickly identify which RUs are dedicated to DiL/DL transmission and which RUs are conventionally used for uplink MU transmission.

Preferably, the AID value is selected between 2008 and 2044. This avoids any conflict with the AIDs assigned by the AP to the non-AP stations upon registration.

In other embodiments, the signaling includes a single bit enabled. This saves bits.

In specific embodiments, the field is the User Info field associated with the resource unit according to 802.11ax v3.0. This makes it possible to keep the conventional structure of 802.11ax.

In some embodiments, a Trigger Dependent User Info subfield of the User Info field comprises an AID of the destination triggered station or an AID of a source triggered station transmitting in the resource unit or both. This makes it possible to overcome the insufficient number of fields in conventional 802.11ax fixed subfields of User Info field, while keeping the conventional 802.11ax format for this field.

According to a specific feature, the Trigger Dependent User Info subfield also includes a binary flag which indicates whether the resource unit is allocated for direct link transmission between two triggered stations or for downlink transmission from the triggering station to the destination triggered station.

In yet other embodiments, the field includes at least one destination identifier identifying one or more destination triggered stations of the data transmission and a source identifier identifying a source triggered station intended to transmit in the resource unit.

In a specific embodiment, the field includes the User Info field associated with the resource unit according to 802.11ax v3.0 supplemented with an additional (fixed-length) subfield for storing one of the identifiers.

In another specific embodiment, the field includes a DiL bit (B39), which when disabled defines the field as the User Info field associated with the resource unit according to 802.11ax v3.0 and when enabled defines the field with the same length (of size-defined fields) and includes the source and destination identifiers. The DiL bit may be the reserved 39th bit (B39) of the User Info field according to 802.11ax.

In particular, the UL FEC Coding Type, UL MCS, UL DCM and SS Allocation/RA-RU Information fields of the User Info field according to 802.11ax v3.0 may be replaced by a subfield storing one of the source and destination identifiers in the field when the DiL bit is enabled.

These embodiments advantageously do not require the 802.11ax hardware parser to be modified.

According to a specific feature, the identifier or identifiers are AIDs assigned to stations by an access point during association.

Opposed to this explicit signaling, implicit signaling may be used to save bits. In that case, the method may further comprise, at the triggering station, defining a direct link (DiL) session identifier for a direct link session established between a source triggered station and at least one destination triggered station, and signaling, in the trigger frame, the allocation of the resource unit for direct link transmission between the source and destination triggered stations using the DiL session identifier. It may mean that a single AID value simultaneously signals the DiL purpose and each of the stations involved in the DiL. This obviously save bits compared to signaling each station separately together with a separate indication for DiL purpose.

In some embodiments, the DiL session identifier is stored in an AID12 subfield of a User Info field associated with the resource unit in the trigger frame according to 802.11ax v3.0. This makes it possible to keep unmodified the 802.11ax format for the User Info field.

In other embodiments, the DiL session identifier is selected by an access point, AP, from AIDs not assigned to non-AP stations during association. This allows an efficient and dynamic management of the DiL session identifier. Indeed, the AP has an overall view of the wireless network, in particular of the AIDs already assigned. Furthermore, this approach avoids having a conflict between AIDs.

In specific embodiments, the DiL session identifier is selected from a range of AID values that is distinct from the range of AID values used by the AP to allocate AIDs to non-AP stations during association. For instance, the DiL session identifier is selected from range [2008, 2044] or from a subset thereof. These provisions also contribute to reduce conflicts between AIDs.

As far as the triggered station receiving the trigger frame and sending data frames over a DiL RU is concerned, it may, prior to sending the data frame, determine, using the trigger frame, that the non-AP station is a source non-AP station for the direct link transmission. This may be based on any signaling scheme introduced above.

In a variant where the DiL RU is a random DiL RU, the station may, prior to sending the data frame, contend for access to the resource unit allocated for direct link transmission.

As far as the triggered station receiving the trigger frame and receiving data frames over a DL/DiL RU is concerned, it may, prior to receiving the data frame, determine, using the trigger frame, that the triggered station is the destination triggered station. This may be based on any signaling scheme introduced above.

Where the signaling scheme used at trigger frame level lets open the destination stations, the triggered station may determine, based on the data frame received, whether the data frame is addressed to the triggered station or not.

Another aspect of the invention relates to a non-transitory computer-readable medium storing a program which, when executed by a microprocessor or computer system in a device, causes the device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 1 illustrates a typical wireless communication system in which embodiments of the invention may be implemented;

FIGS. 2a and 2b illustrate a conventional trigger-based (TB) MU UL OFDMA transmission according to 802.11ax;

FIG. 3 illustrates the format of a trigger frame as described in section 9.3.1.23 of the 802.11ax standard to perform MU UL OFDMA transmissions;

FIG. 4 illustrates a trigger-based (TB) Multi-User (MU) transmission that includes, in addition to conventional MU UL transmissions to the triggering station, MU transmissions directed to triggered stations;

FIGS. 5a to 5d illustrate various formats of a User Info field for signalling DiL and/or DL resource units in a trigger frame;

FIGS. 6 to 6b illustrate, using flowcharts, operations performed at the triggering station, e.g. the AP, according to various embodiments;

FIG. 7 illustrates a typical Direct Link (DiL) setup mechanism supplemented with DiL need retrieval by the AP according to embodiments;

FIGS. 8 to 8b illustrate, using flowcharts, operations performed at the triggered stations, e.g. the non-AP stations, according to various embodiments;

FIG. 10a shows a schematic representation a communication device in accordance with embodiments of the present invention; and FIG. 10b shows a schematic representation of a wireless communication device in accordance with embodiments of the present invention.

DETAILED DESCRIPTION OF EMBODIMENTS

Figure 5C:
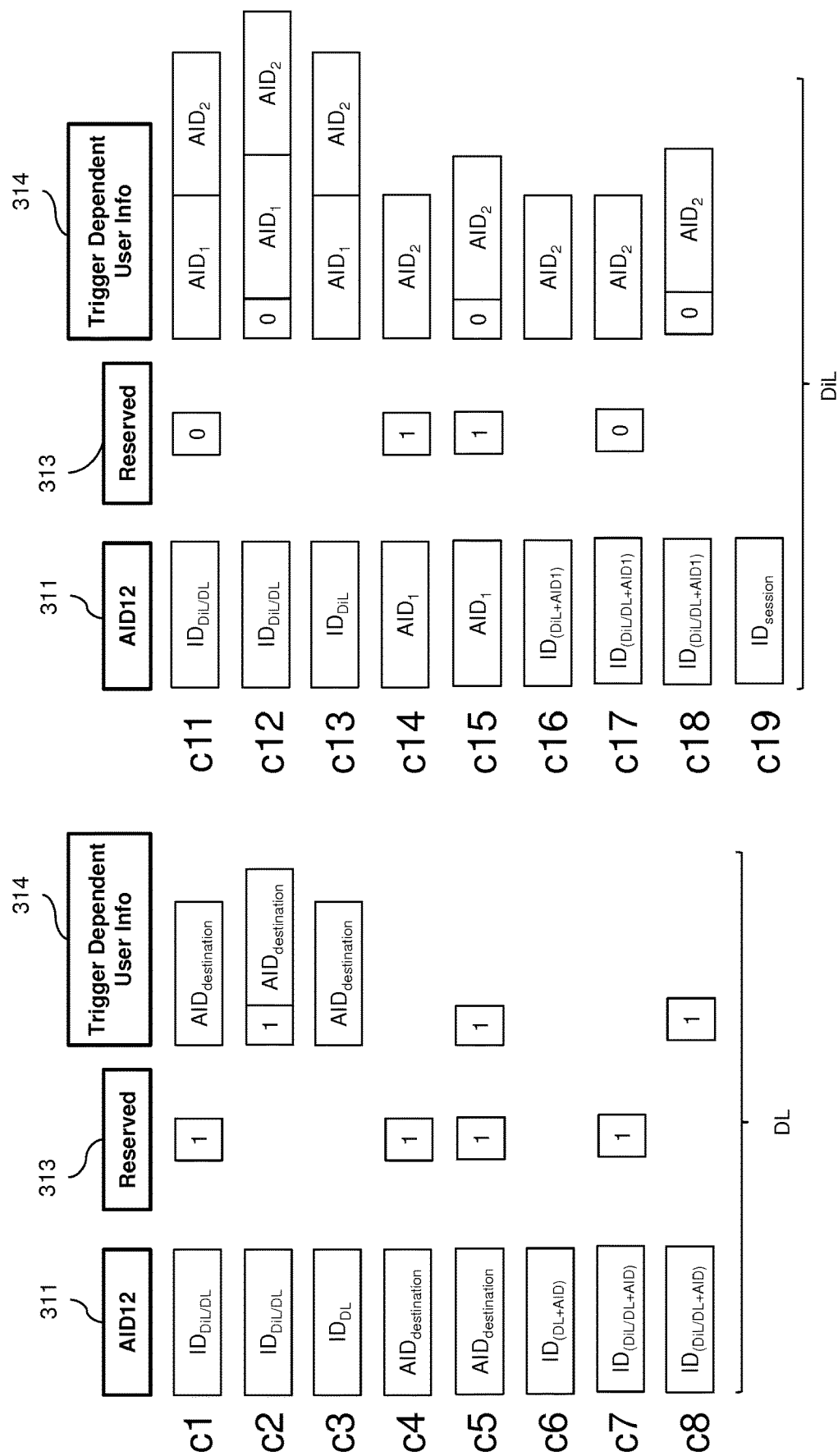

Aspects of the present disclosure generally relate to enhanced multi-user (MU) uplink (UL) protocols in wireless networks that allow non-UL transmissions to be performed simultaneously with triggered MU UL transmissions. As will be described in more detail herein, a station may send a trigger frame triggering MU transmissions with an appropriate signaling to allow non-UL transmissions, i.e. transmission to another station, in a resource unit of the MU transmission. Examples of non-UL transmissions include Direct Link transmissions as well as downlink (DL) transmissions.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless station implemented in accordance with the teachings herein may comprise an access point (so-called AP) or not (so-called non-AP station).

An AP may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a non-AP station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

FIG. 1 illustrates a wireless communication system in which several communication stations 101-107, 110 exchange data frames over a radio transmission channel 100 of a wireless local area network (WLAN), under the management of a central station, namely access point (AP) 110 with which the stations have registered. In a variant, direct communications between stations can be implemented without the use of an access point (known as an Ad-hoc mode). The radio transmission channel 100 is defined by an operating frequency band constituted by a single channel or a plurality of channels forming a composite channel.

An exemplary wireless network is the 802.11 network according to 802.11ax version 3.0 standard (published in June 2018).

Each non-AP station 101-107 registers to the AP 110 during an association procedure. During the well-known association procedure, the AP 110 assigns a specific Association IDentifier (AID) to the requesting non-AP station. An AID is a 16-bit value uniquely identifying the non-AP station. According to IEEE standard, the value of an AID is assigned in the range 1 to 2007 for Directional multi-gigabit non-AP station; the 5 MSBs of the AID are reserved.

All the stations 101-107, 110 compete one against each other using EDCA (Enhanced Distributed Channel Access) contention, to access the wireless medium in order to be granted a transmission opportunity (TXOP) and then transmit data frames.

To increase wireless network efficiency, multi-user (MU) schemes are available to allow a single station, usually the AP 110, to schedule MU transmissions, i.e. multiple simultaneous transmissions to or from other stations, in the wireless network. Such a MU scheme has been adopted in 802.11ax, as the Multi-User Uplink and Downlink OFDMA (MU UL and DL OFDMA) procedures.

With reference to FIG. 2a, to actually perform such MU UL transmission, the 802.11ax standard splits a granted communication channel into resource units 201-204 (RUs) that are shared in the frequency domain by the multiple stations, based on Orthogonal Frequency Division Multiple Access (OFDMA) technique.

To finely control the MU UL transmissions by the non-AP stations 101-107, the AP 110 sends a trigger frame 210 which defines how the channel is split into RUs and which non-AP station is allowed to transmit over each RU. In this example, trigger frame 210 assigns RU 201 to STA1, RU 202 to STA2, RU 203 to STA3 and RU 204 to STA4. The assignment is made using the AIDs of the non-AP stations.

Upon reception of trigger frame 210, each non-AP station determines its assigned RU thanks to its own AID and can start transmit MU frames 220 (known as HE TB PPDU) over its assigned RU to the AP after a SIFS period after trigger frame 210.

Due to the triggering mechanism, the terms "trigger-based MU UL transmission" are used.

FIG. 2b illustrates the same MU UL transmission from station perspective.

FIG. 3 illustrates the format of a trigger frame as described in section 9.3.1.23 of the 802.11ax standard, draft version 3.0, to perform MU UL OFDMA transmissions.

The trigger frame 210 contains several fields as defined in the IEEE standard 802.11ax and in particular it includes a single Common Info field 300 and a plurality of User Info fields 310.

Each User Info field 310 defines the assignment of the RUs to respective non-AP stations 101-107, as well as communication parameters to respect for UL communication with the AP. To do so, RU Allocation subfield 312 identifies the RU concerned (central frequency and frequency bandwidth), while AID12 subfield 311 carries the 12 LSBs of the AID of the non-AP station for which the RU is assigned.

Bit B39 313 of User Info field 310 is currently not used. Trigger Dependent User info subfield 314 is mainly used to provide details on communication parameters defined by the other subfields of the User Info field 310. The content of Trigger Dependent User info subfield 314 depends on the type of trigger frame. The format shown in the Figure corresponds to Trigger Dependent User info subfield 314 of a basic trigger frame.

The User Info field as defined in 802.11ax thus clearly authorizes only UL transmissions as only the source non-AP station is identified in AID12 subfield 311.

In order to further address the issue of increasing bandwidth and decreasing latency requirements that are demanded for wireless communications systems in high-density environments, aspects of the invention seek to efficiently vary the transmissions allowed in a triggered MU transmission. Aspects of the invention provide features allowing Direct Link (DiL) transmissions and/or Downlink (DL) transmissions to be scheduled in a MU transmission by using an enhanced trigger frame. To that end, the trigger frame sent by the triggering station (usually an AP) to other triggered stations (usually non-AP stations) is enhanced into a trigger frame allocating a resource unit of the MU transmission for data transmission to one of the other triggered station, usually a destination non-AP station.

A station receiving the trigger frame is referred to as triggered station, while the station sending the trigger frame is referred to as triggering station.

The newly proposed trigger frame offers Direct Link (DiL) and/or Downlink (DL) transmission capabilities within the triggered MU transmission, in addition to Uplink (UL) capabilities.

An uplink MU transmission is defined as a MU transmission from a non-AP station to the AP.

A Downlink MU transmission is defined as a MU transmission from the AP to one or more (non-AP) stations.

A Direct Link (DiL) MU transmission is defined as a MU transmission from one non-AP station to one or more other non-AP stations.

Although the triggering station may be any of stations 101-107, 110, the examples provided below mainly concentrate on the AP 110 as the triggering station and non-AP stations 101-107 as the triggered stations. Of course other configuration may be implemented where the AP is a triggered station and one non-AP station is the triggering station.

As will be described in more detail herein, a triggered station may then send a data frame directly to a destination triggered station using the resource unit allocated, by the trigger frame, for direct link transmission to that destination triggered station. This implements the Direct Link (DiL) capability offered during the triggered MU transmission, from a DiL source triggered station perspective.

Also, another triggered station may then receive a data frame over the resource unit allocated for data transmission to the triggered station. This implements the Direct Link capability from DiL destination station perspective or the Downlink capability when the data frame come from the AP.

Below, DiL RU refers to a resource unit so allocated for Direct Link transmission; DL RU refers to a resource unit allocated for Downlink transmission; and DiL/DL RU refers to a resource unit allocated for Direct Link or Downlink transmission.

FIG. 4 illustrates a trigger-based (TB) Multi-User (MU) transmission that includes, in addition to conventional MU UL transmissions to the triggering station (the AP), MU transmissions directed to triggered stations (one or more non-AP stations).

In this example, the MU transmission 420 triggered by trigger frame 410 contains conventional uplink MU frames 430, 460 over RU 201 (from non-AP STA1 to AP 110) and RU 204 (from non-AP STA5 to AP 110), downlink (DL) MU frames 450 over DL RU 203 (from AP 110 to non-AP STA3) and Direct Link (DiL) MU frames 440 over DiL RU 202 (from non-AP STA 2 to non-AP STA 4). More generally, the number of DL RUs may vary, as well as the number of DiL RUs. In embodiments, there may be only DL RUs in addition to conventional UL MU RUs or only DiL RUs in addition to conventional UL MU RUs.

Aspects of the invention provide that trigger frame 410 conveys the signaling of such DiL/DL MU resource units. Then, upon reception of the trigger frame, the triggered stations (here non-AP stations) are able to determine whether they are allocated a resource unit for DiL or DL transmission, and in the affirmative which resource unit either to transmit or to receive. Various implementations of the signaling of DiL or DL RUs are contemplated as illustrated in FIG. 5.

In all these implementations, a field associated with the resource unit in the trigger frame includes a signaling that the resource unit is intended for data transmission to a destination triggered station (usually non-AP).

FIGS. 5a and 5b illustrate DiL/DL RU signaling that slightly modifies the conventional 802.11ax User Info field 310 for a DiL/DL RU. This is to add another subfield to indicate one of the stations possibly involved in the DiL/DL transmission. In these figures, the field includes at least one destination identifier identifying one or more destination triggered stations of the data transmission and a source identifier identifying a source triggered station intended to transmit in the resource unit. In practice, the identifier or identifiers are AIDs assigned to the stations by the AP during association.

FIG. 5a describes a new format of User Info field 500 which is the User Info field associated with the resource unit according to 802.11ax v3.0 supplemented with an additional subfield for storing one of the identifiers. Conventional AID12 subfield 501 is used to store for instance the source identifier AID12 src (in variant it could store the destination identifier). AID12 dest 502 is the new subfield allowing the destination (or source in a variant) triggered station to be specified.

In the example, the new subfield 502 is inserted after RU allocation subfield 312, between bits B20 and B31. The other subfields of conventional 802.11ax User Info field 310 remain the same. In variants, the new subfield 502 can be inserted in other positions between two 802.11ax conventional subfields.

Thanks to the same new subfield 502, any kinds of transmission can be defined per resource unit by the trigger frame for triggered-based MU transmission. Indeed, the User Info field 500 can specify a resource unit where the MU frame is sent from any station (AP or non-AP station) to any other station (AP or non-AP) (i.e. downlink MU transmissions, Uplink MU transmission or Direct Link MU transmission).

FIG. 5b illustrates another format of User Info field 510 which is implemented when reserved bit B39 313 is enabled. Advantageously, when B39 is disabled (value=0), the same User Info field as defined in 802.11ax can be used. In other words, the field 510 includes a DiL bit (reserved bit B39), which when disabled defines the field as the User Info field associated with the resource unit according to 802.11ax v3.0 and when enabled defines the field with the same length (in particular of the size-defined fields) and includes the source and destination identifiers. Thus, B39 notifies the triggered stations when the associated resource unit is allocated for DiL (B39=0).

This approach of keeping the same size of the User Info field advantageously allows the same 802.11ax hardware parser to be used.

As the UL FEC Coding Type, UL MCS, UL DCM and SS Allocation/RA-RU Information fields of the User Info field according to 802.11 ax v3.0 define parameters set by the AP for optimal reception by the AP, they are no longer necessary for a resource unit allocated to Direct Link transmission. As a consequence, these fields (from B20 to B31) are preferably replaced by a subfield 502 storing one of the source and destination identifiers in the field when DiL bit B39 is enabled.

FIG. 5c illustrates a series of use configurations of the conventional 802.11ax User Info field 510 for implementations of the present invention. The conventional 802.11ax format is not modified, but is only extended to support DiL MU transmissions and Downlink MU transmissions over the corresponding resource unit. $AID_1$ and $AID_2$ represent source and destination identifiers (in any order).

Formats c1-c3 and c11-c13 use the conventional AID12 subfield 311 to signal DiL or DL purpose. In other words, the field User Info field 510 associated with the resource unit includes an AID12 subfield 311 which, when including an AID assigned to a specific non-AP (triggered) station during association with the AP, allocates the resource unit to the specific non-AP (triggered) station for uplink transmission (to the triggering station, the AP usually), and the DiL/DL signaling includes setting, in the AID12 subfield, an AID value reserved to data transmission to a destination triggered station.

The reserved (or dedicated) AID value can be selected (by the AP) from among the unused AID value, i.e. usually between 2008 and 2044, for instance 2044. Various values may be used. Thus, each non-AP station receiving a User Info field with AID12=2044 directly knows the corresponding RU is allocated for DiL/DL transmission.

In exemplary formats c1-c2 and c11-c12, the reserved AID value is common for DiL and DL signaling. In that situation, an additional flag is set to distinguish between DiL and DL. In formats c1 and c11, the additional flag is bit B39 which is set to 1 for DL transmission and to 0 for DiL transmission (or the opposite scheme). In formats c2 and c12, this additional flag is stored in the Trigger Dependent User Info subfield 314, meaning the Trigger Dependent User Info subfield also includes a binary flag which indicates whether the resource unit is allocated for direct link transmission between two triggered stations or for downlink transmission from the triggering station to the destination triggered station.

In exemplary formats c3 and c13, different reserved AID values are used for DiL and DL signalling respectively. Again, the reserved AID value can be selected from among the unused AID value, i.e. usually between 2008 and 2044, for instance value 2044 is dedicated for DL and value 2043 is dedicated for DiL. In both DL and DiL cases, the Trigger Dependent User Info subfield 314 of the User Info field comprises the AID of the destination triggered (non-AP) station, if any. For DiL specific case, the Trigger Dependent User Info subfield also includes an AID of the source triggered (non-AP) station transmitting in the resource unit, if any.

Formats c4-c5 and c14-c15 use reserved bit B39 313 to signal DiL or DL purpose. In other words, the signaling includes a single bit enabled. Conventional AID12 subfield 311 is thus used to store the destination identifier (for DL and preferably for DiL) or the source identifier (for DiL). The second (source or destination) identifier for DiL can be stored in the Trigger Dependent User Info subfield 314.

Formats c4 and c14 apply when either DiL or DL, but not both, are implemented in addition to conventional 802.11ax. When DL is implemented without DiL, enabled B39 313 signals DL RU (format c4), while when DiL is implemented without DL, enabled B39 313 signals DiL RU (format c14).

When for DL and DiL are both implemented (formats c5 and c15), an additional flag is set to distinguish between those two purposes. As bit B39 is no longer available, this additional flag is stored in the Trigger Dependent User Info subfield 314. In the example shown, this additional bit is set to 1 to indicate DL (format c5) or is set to 0 to indicate DiL (format c15) in which case the second (source or destination) identifier is also specified in subfield 314.

A variant to formats c4-c5 and c14-c15 may consist in providing the DIL/DL bit (or more generally binary flag) in the Trigger Dependent User Info subfield 314 and not in reserved bit B39 313.

In formats c6-c8 and c16-c18, the DiL/DL signaling jointly (i.e. with the same bits) specifies one identifier: the destination identifier (for DL and preferably for DiL) or the source identifier (for DiL). Conventional AID12 311 subfield may be used to that purpose. It means a dedicated AID value (for AID 12 subfield) both signals:
  DL together with a specific destination station (format c6). For example AID=1955 may be allocated to designate a Downlink involving station with AID=50 as a destination station;
  DiL together with either specific destination or source station (format c16). In that case, the other station may be specified in the Trigger Dependent User Info subfield 314. For example AID=1283 may be allocated to designate a Direct Link involving station with AID=177 as a destination (or source) station;
  DL or DiL together with a specific station (c7, c8, c17, c18). In that case, an additional flag is set to distinguish between DiL and DL, which may be carried by bit B39 (c7 and c17 where 1 is for DL transmission and 0 is for DiL transmission) or by the Trigger Dependent User Info subfield 314 (c8 and c18 where 1 is for DL transmission and 0 is for DiL transmission). For DiL, the other station identifier can be stored in the Trigger Dependent User Info subfield 314.

These dedicated AIDs may be allocated by the AP upon having knowledge of DL or DiL intents from stations.

FIG. 5d illustrates an exemplary implementation of the Trigger Dependent User Info subfield 314 used for the formats of FIG. 5c.

Subfields 550-553 are defined in 802.11ax. When the Trigger Dependent User Info subfield 314 is enhanced for the formats of FIG. 5c, additional subfields are added after subfields 550-553.

Subfield 554 may carry the additional flag set to distinguish between DiL and DL, when necessary. Although it can be a single bit, the example shown provides a 4-bit subfield, two possible values of which (here 0 and 1) are used to signal DL and DiL respectively and the other possible values of which are reserved for future use. Of course another length for subfield 554 can be used. This subfield is implemented in formats c2, c5, c8, c12, c15 and c18.

Subfields 555 and 556 are 12-bit subfields used to carry source and destination identifiers when required (formats c1-c3 and c11-c18). Only one of these two subfields may be provided when required (formats c1-c3 and c14-c18).

Subfield 557 provides additional (reserved) bits for future use.

Of course, any other orders and positions for subfields 550-557 can be contemplated.

Although formats c11-c18 have been described above in relation to DiL transmission only, they may be used for DL purposes. These formats provide one source identifier and one destination identifier ($AID_1$, $AID_2$). In some embodiments, the source identifier is set to a reserved AID, for instance 0, not assigned to non-AP stations during association, in order to signal the resource unit is allocated for downlink transmission to the destination triggered station. In that situation, the value of the source identifier operates as a specific signaling between DiL and DL (for instance in replacement of a specific bit or flag—B39 for formats c11 and c17 or a flag in field 314 for formats c12, c15 and c18).

Back to FIG. 5c, last format c19 relies on the use of direct link (DiL) session identifiers. The triggering station, i.e. most often the AP, defines a direct link (DiL) session identifier for a direct link session established between a source triggered (non-AP) station and at least one destination triggered station. The triggering station then signals (in the trigger frame) the allocation of the resource unit for direct link transmission between the source and destination triggered stations using the DiL session identifier.

In the example shown, the DiL session identifier is stored in AID12 subfield 311 of conventional 802.11ax User Info field associated with the resource unit in the trigger frame. It means that a single AID value simultaneously signals the DiL purpose and each of the stations involved in the DiL. Such DiL session identifier may be dynamically provided by the AP upon having knowledge of the DiL sessions or may be set in advance. Preferably, the DiL session identifier is selected by the AP from AIDs not assigned to non-AP stations during association, for instance from a range of AID values that is distinct from the range of AID values used by the AP to allocate AIDs to non-AP stations during association. As an example, the DiL session identifier may be selected from range [2008, 2044] or from a subset thereof. In a variant, available AID in the range [1, 2007] or in a subset thereof may be used.

In these various formats, it is proposed to specify one destination identifier (AID) of a destination non-AP station, and when appropriate, to specify the source identifier. Thus, the trigger frame identifies one destination triggered station for the direct link transmission or for the downlink transmission, and when appropriate, the trigger frames allocates the resource unit to a specific source triggered station for direct link transmission.

In some embodiments, the trigger frame may identify more than one destination triggered station. This may involve several subfields to store several destination AIDs. Also, broadcast or multicast AIDs may be implemented (meaning the AID designates a plurality of triggered stations) in a single AID subfield.

However, embodiments may provide that the trigger frame does not indicate a destination triggered station, i.e. indicates that the source station choses the destination triggered station for DiL or DL transmission. It means the trigger frame does not define the destination station for the RU concerned. It is up to the source station accessing the RU to decide to which non-AP station it wishes to send data. Again, this may be done by omitting indicating, in the trigger frame, an AID specific to a destination non-AP station (a reserved AID may be used as $AID_{destination}$ or $AID_1$ or $AID_2$ of formats c1-c5, c11-c18) or by using a specific AID (in $AID_{12}$ subfield for instance) reserved to signal a general DL or DiL RU without specified destination triggered station (for formats c6-c8, c16-c19). Also, the AID subfield for the destination identify may be left empty. In that situation, the identification of the destination triggered station or stations may be made by the source station in the data directly.

The same may apply for the source triggered station for DiL transmission: the trigger frame may not specify the source station. In that case, the trigger frame indicates the resource unit is accessible through contention by triggered stations for direct link transmission to the destination triggered station. This may be done by omitting indicating, in the trigger frame, an AID specific to a source non-AP station (a reserved AID such as 0 may be used in fields AID1 or AID2 corresponding to the source triggered station—formats c11-c15) or by using a specific AID (in AID12 subfield for instance) reserved to signal a general DiL RU without specified source triggered station (for formats c16-c19) or by leaving the AID subfield for the source identifier empty. The resulting resource unit is thus seen as a random RU for DiL transmission.

In embodiments, a DiL RU may designate neither the source station nor the destination station(s).

Turning now to the operations made by the triggering station and triggered stations, usually the AP and the non-AP stations respectively, FIG. 6 illustrates, using a flowchart, general steps performed by the triggering (here AP) station.

At step 600, the AP generates a trigger frame 410 to trigger a multi-user, MU, transmission. As introduced above, the trigger frame 410 allocates a resource unit of the MU transmission for data transmission to a destination triggered station, usually a destination non-AP station. Any of the signaling described above can be used.

Decision to include such DiL or DL resource unit in the next MU transmission may be based on various criteria at the AP. For instance, the AP may have received Direct Link needs from non-AP stations and, responsive to the reception, decide to allocate a RU to DiL for these stations. In a variant, a RU (for DL or DiL purpose) may be allocated periodically.

For efficiency purposes, DL RUs and scheduled RUs (i.e. those for which the source station is known) for UL or DiL are preferably declared in the trigger frame before random RUs (source station not known—the stations access to such RUs through contention) for UL or DiL transmissions. This allows a non-AP station to know if it has a RU allocated for it before attempting to contend for access to a random RU either for UL or DiL transmission.

Note the order of RU declaration is the order of corresponding User Info fields 310 in the trigger frame.

At step 610, the trigger frame 410 is sent by the AP to triggered stations, usually non-AP stations.

FIG. 6a illustrates, using a flowchart, general steps performed by the triggering (here AP) station for DL transmission.

Steps 600 and 610 remain the same as in FIG. 6, wherein the resource unit is allocated for downlink (DL) transmission from the AP to the destination non-AP station. Any signaling of FIGS. 5a, 5b or signaling format c1-c8 can be used. The result of such DL transmission is that full duplex may be achieved in the context of MU transmission.

Once the RUs have been declared to the stations through the trigger frame 410, the AP identifies a DL-allocated RU in the triggered-based MU transmission and uses this DL-allocated resource unit to send a data frame to the destination non-AP station. This is step 620.

FIG. 6b illustrates, using a flowchart, exemplary steps performed by the triggering (here AP) station for Direct Link transmission.

Prior to building the trigger frame 410 at step 600, the AP performs a DiL requirements collection, i.e. it collects all the needs the non-AP stations have concerning Direct Link transmissions. This is step 690.

It may include a step 691 where the AP sends the non-AP stations a request to provide their DiL needs. Responsive to the request, each non-AP station sends its DiL needs which are received by the AP at step 692.

In a variant, the non-AP station may spontaneously send at step 692 their DiL needs when they arise.

For instance, DiL needs may result from a Direct Link session establishment. FIG. 7 illustrates a typical Direct Link (DiL) setup mechanism supplemented with DiL needs retrieval by the AP. The DiL needs may include bandwidth requirement from the non-AP stations willing to exchange data frame with other non-AP stations.

The flowchart describes the exchange between the AP 110 and non-AP stations STA2 102 and STA4 104 (involved in a DiL transmission in FIG. 4). Non-AP station 102 and Non-AP station 104 are able to transfer data directly with each other without involving the AP. Such a mechanism is based on the 802.11z amendment of the 802.11 standard referred to as Tunneled Direct Link Setup (TDLS).

Basically, step 700 of DiL session establishment consists in establishing the DiL session based on TDLS mechanism. Non-AP station STA2 102 sends a TDLS setup request frame 701 to non-AP station STA4 104. If non-AP station STA4 104 agrees, it sends a TDLS setup response 702 indicating an acceptance of the TDLS procedure. Upon reception of a positive TDLS setup response (response containing an acceptance by the non-AP station STA4 104), non-AP station STA2 102 sends back a TDLS confirm frame 703 to non-AP station STA4 104. Then the tunnelled direct link communication is established. The messages exchanged are used by the two non-AP stations to agree on transmission parameters to be used for the DiL transmission.

At this stage, a DiL session is established between non-AP station STA2 102 and non-AP station STA4 104. However, AP 110 is not yet aware of such DiL session (and thus of related DiL needs for the non-stations).

Thus step 690 of DiL requirements (needs) collection is executed, during which AP 110 retrieves the DiL requirements of at least one of the two non-AP stations involved in the DiL session.

For instance, in a first embodiment, the retrieval is initiated by AP 110. To do so, a request is sent by AP 110 to the non-AP stations at step 691 as explained above. For illustration purposes, a specific type of trigger frame may be defined for such a request, corresponding to Buffer Status Report Poll for DiL transmission (DL-BSRP). More precisely, a trigger frame 500 is generated with a 802.11 Trigger Type subfield of the single Common Info field 300 set to a given value between 8 and 15, corresponding to Buffer Status Report Poll for DiL transmission (DL-BSRP). Once receiving the DL-BSRP trigger frame, at least one non-AP station, preferably each one, that has some data frames to send to another non-AP station through direct link, sends a DiL Report (692) including for instance the buffer status corresponding to the amount of data ("DiL data") held in an emission buffer ready to be transmitted directly to another non-AP station.

According to another embodiment, the non-AP station sends its DiL Report (692) spontaneously, without being requested by AP 110.

According to yet another embodiment, the non-AP stations send periodically their DiL Reports or send them when an amount of DiL data in their local buffers exceeds a given threshold.

Based on these collected DiL needs, the AP may apply DiL policies to decide whether or not adding a DiL RU in the next trigger frame 410.

Of course, DiL requirements collection step 690 is optional in that AP 110 may also allocate DiL resource units based on other criteria than station's DiL requirements.

When a DiL RU has to be provided, steps 600 and 610 are executed as described above with reference to FIG. 6, wherein the resource unit is allocated for direct link transmission between at least two triggered stations.

FIGS. 8 to 8b show operations at a triggered (usually non-AP) station.

FIG. 8 illustrates, using a flowchart, general steps performed by such a triggered station, here a non-AP station, when acting as a destination station of DiL or DL transmission.

At step 800, the non-AP station receives, from a triggering station, usually AP 110, trigger frame 410 triggering a multi-user, MU, transmission, wherein the trigger frame allocates a resource unit of the MU transmission for data transmission to a destination triggered station. The non-AP station thus determines, e.g. using trigger frame 410, that the non-AP station is the destination triggered station, i.e. whether it is involved in one of the RUs provided by trigger frame 410.

Allocation of a Scheduled RU according to 802.11ax is not described here. However, it is handled in a conventional way.

The determination of involvement of the non-AP station to one DiL or DL RU may include comparing its AID with the AIDs signaled in the User Info fields of the RUs (as shown in FIG. 5) or detecting a multicast or broadcast AID as destination AID.

When the DiL/DL RU is signaled without specifying one or more destination triggered station, the addressee(s) of the data frame may be included in the data frame itself (usually at the very beginning). In that case, the non-AP station may thus listen to the corresponding RU and wait for determining, based on the data frame, whether the data frame is addressed to the non-AP station or not, i.e. for detecting its AID (or a broadcast/multicast AID) before going to next step 810.

If the affirmative of the determination, the non-AP station thus receives one or more data frames over the determined DiL/DL resource unit allocated for data transmission to the destination triggered station. This is step 810. In case of DL transmission, the data frame is received from usually the AP, while in case of DiL transmission, it is received from another (non-AP) triggered station.

FIG. 8a illustrates, using a flowchart, an embodiment of operations performed by a triggered station, here a non-AP station, when acting as a destination station of DiL transmission.

In this flowchart, early in the process, the non-AP station provides the triggering (AP) station with its DiL needs. This is step 890 which is symmetrical to step 690 already described above. This step is optional (in particular because the DiL needs for a destination are not relevant) and comprises a first optional substep 891 of receiving a request for DiL requirements collection from AP 110 and a second substep 892 of sending a DiL report to AP 110.

Next, steps 800 and 810 are performed as described above.

FIG. 8b illustrates, using a flowchart, general steps performed by a triggered station, here a non-AP station, when acting as a source station for DiL transmission.

Optional step 890 is performed to provide AP 110 with DiL needs of the non-AP station. Step 890 is described above.

Next, step 800 is performed as described above: the non-AP station receives, from a triggering station, usually AP 110, trigger frame 410 triggering a multi-user, MU, transmission, wherein the trigger frame allocates a resource unit of the MU transmission for direct link (DiL) transmission to a destination triggered station. Also, the non-AP station determines, e.g. using trigger frame 410, whether it is involved as source station in one of the RUs provided by trigger frame 410.

The non-AP station may use the signaling as shown in FIG. 5: for instance, if the non-AP station's AID is specified as a source identifier. Alternatively, if no source identifier is specified for an allocated DiL RU, the non-AP station may contend for access to such DiL RU and be granted the access.

Once the DiL RU is known, the non-AP station sends a data frame directly to the destination triggered station using the resource unit allocated for direct link transmission. This is step 820.

Figure 9:
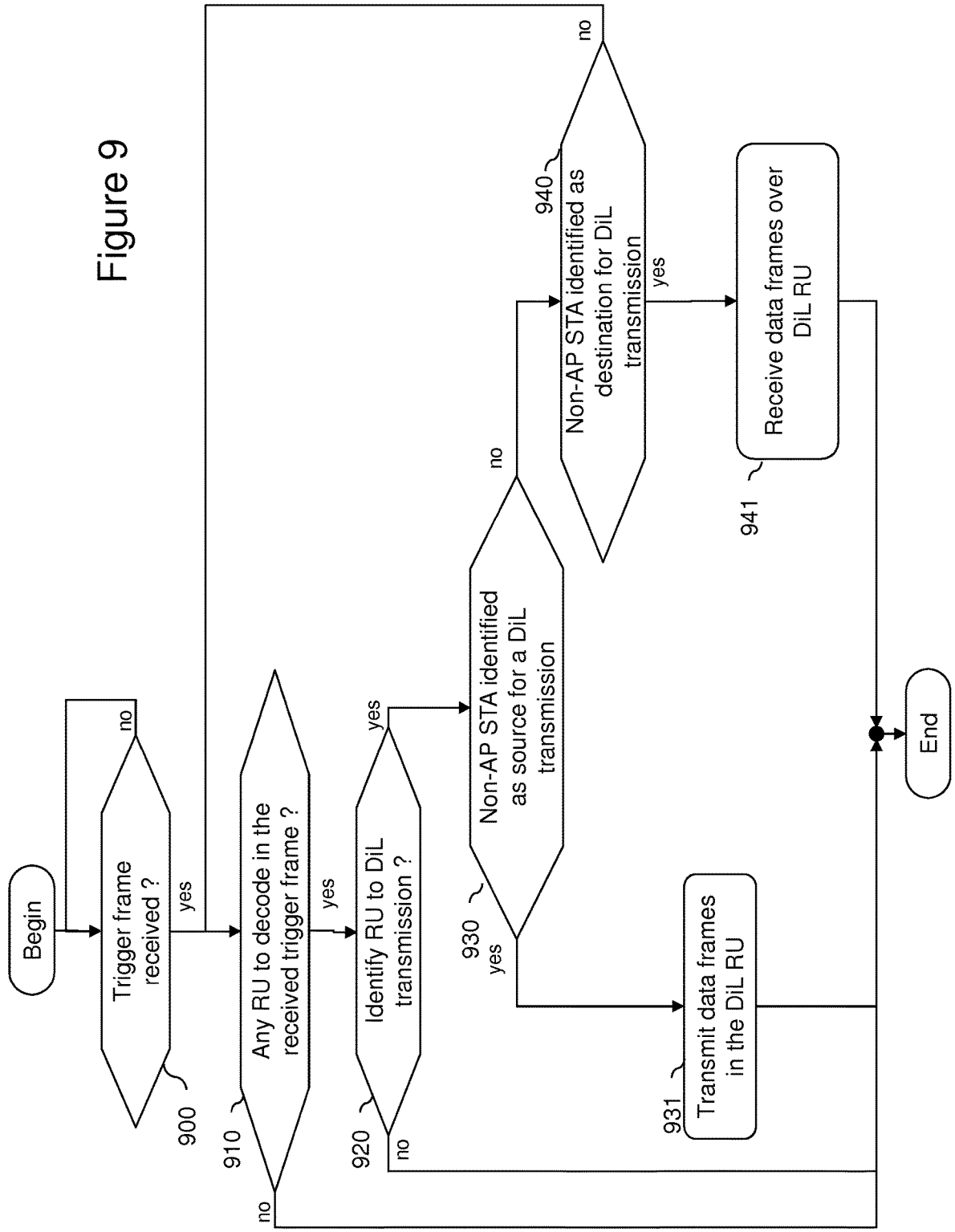
FIG. 9 illustrates, using a flowchart, operations by a non-AP station upon receiving a trigger frame 410 defining a DiL resource unit.

As the same non-AP station can be a source triggered station and a destination triggered station for DiL transmission, its role is usually defined by the signaling provided in trigger frame 410. FIG. 9 illustrates, using a flowchart, operations by such a non-AP station upon receiving a trigger frame 410 containing a DiL User Info field having for instance any DiL signalling of FIG. 5.

Upon receiving a new trigger frame at step 900, the non-AP station analyses each User Info field 310/500/510 one after the other to determine whether an RU is provided (step 910) and, if any, whether there is a DiL RU (step 920). It may merely consist in using the signaling of FIG. 5 to identify a User Info field scheduling a resource unit for DiL transmission.

In the affirmative, the non-AP station determines whether it is identified (in the User Info field concerned) as a source station (test 930) or, in the negative, as a destination station (test 940).

When the non-AP station is identified as a source station for the DiL transmission, the station transmits data frames within the identified resource unit (step 931). Otherwise if the non-AP station is identified as a destination station for the DiL transmission, the station waits and receives data frames over the identified resource unit (step 941). Note that if the non-AP station is neither identified as a source station or destination station, it may contend for access to a declared random DiL RU to then transmit (step 931) or listen to data frames in declared DiL RUs (with no destination identifier) to determine whether some of them are addressed to it (step 941).

If none of the previous conditions are fulfilled, the non-AP station is not concerned by the RU currently analyzed. It then continues the decoding of the next User Info field (looping back to step 910).

FIG. 10a schematically illustrates a communication device 1000, either a non-AP station 101-107 or the access point 110, of the radio network 100, configured to implement at least one embodiment of the present invention. The communication device 1000 may preferably be a device such as a micro-computer, a workstation or a light portable device. The communication device 1000 comprises a communication bus 1013 to which there are preferably connected:

a central processing unit 1001, such as a processor, denoted CPU;

a memory 1003 for storing an executable code of methods or steps of the methods according to embodiments of the invention as well as the registers adapted to record variables and parameters necessary for implementing the methods; and at least one communication interface 1002 connected to a wireless communication network, for example a communication network according to one of the IEEE 802.11 family of standards, via transmitting and receiving antennas 1004.

Preferably the communication bus provides communication and interoperability between the various elements included in the communication device 1000 or connected to it. The representation of the bus is not limiting and in particular the central processing unit is operable to communicate instructions to any element of the communication device 1000 directly or by means of another element of the communication device 1000.

The executable code may be stored in a memory that may either be read only, a hard disk or on a removable digital medium such as for example a disk. According to an optional variant, the executable code of the programs can be received by means of the communication network, via the interface 1002, in order to be stored in the memory of the communication device 1000 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 10b is a block diagram schematically illustrating the architecture of the communication device 1000, either the AP 110 or one of stations 101-107, adapted to carry out, at least partially, the invention. As illustrated, device 1000 comprises a physical (PHY) layer block 1023, a MAC layer block 1022, and an application layer block 1021.

The PHY layer block 1023 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 410 (FIG. 4) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 1022 preferably comprises a MAC 802.11 layer 1024 implementing conventional 802.11ax MAC operations, and additional block 1025 for carrying out, at least partially, the invention. The MAC layer block 1022 may optionally be implemented in software, which software is loaded into RAM 1003 and executed by CPU 1001.

Preferably, the additional block 1025, referred to as Triggered MU Tx management module for triggered MU transmissions following a medium access trigger frame through OFDMA resource units (sub-channels), implements the part of embodiments of the invention (either from station perspective or from AP perspective).

For instance and not exhaustively, the operations for the station (AP or non-AP) may include, at the AP, generating and sending a trigger frame allocating a RU for DiL or DL transmission, sending data frames to a destination triggered station using a DL RU, and at the triggered stations, receiving such a trigger frame, receiving such data frames from the AP over a DL RU, sending data frames to another triggered station over an allocated DiL RU, receiving data frames from another triggered station over an allocated DiL RU.

MAC 802.11 layer 1024, Triggered MU Tx management module 1025 interact one with the other in order to process accurately communications over OFDMA RU addressed to multiple stations according to embodiments of the invention.

On top of the Figure, application layer block 1021 runs an application that generates and receives data packets, for example data packets such as a video stream. Application layer block 1021 represents all the stack layers above MAC layer according to ISO standardization.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for wireless communication comprising, at an access point (AP):
   generating a trigger frame to trigger a multi-user (MU) transmission, and
   sending the trigger frame to non-AP stations,
   wherein the trigger frame allocates a resource unit of the MU transmission to a non-AP station in which the non-AP station can perform, at the non-AP station's discretion, direct link transmission to another non-AP station or a communication with the AP,
   wherein the allocated resource unit is signaled, in a signaling field within the trigger frame, with a signaling value different from a value signaling a resource unit in which the non-AP station can only perform uplink transmission to the AP,
   wherein the signaling field associated with the resource unit includes an association identifier subfield 12 (AID12 subfield) which, when including an association identifier (AID) assigned to a specific non-AP station during association with the AP allocates the resource unit to the specific non-AP station,
   wherein the signaling value is a reserved AID value set in the AID12 subfield,
   wherein the signaling field is the User Info field associated with the resource unit according to the IEEE 802.11 family of standards, and
   wherein a Trigger Dependent User Info subfield of the User Info field comprises an AID of the other non-AP station or an AID of the non-AP station transmitting in the resource unit or both.

2. The method of claim 1, wherein the trigger frame indicates that the resource unit is accessible through contention by non-AP stations.

3. The method of claim 1, wherein the trigger frame allocates the resource unit to a specific non-AP station.

4. The method of claim 1, wherein the trigger frame indicates that the non-AP station chooses the other non-AP station for the direct link transmission.

5. The method of claim 1, wherein the trigger frame identifies one or more other non-AP stations for the direct link transmission.

6. The method of claim 1, wherein the signaling field is associated with the resource unit in the trigger frame.

7. The method of claim 6, wherein the signaling field includes at least one destination identifier identifying one or more other non-AP stations for the direct link transmission and a source identifier identifying the non-AP station intended to transmit in the resource unit.

8. The method of claim 1, further comprising, at the AP, defining a direct link (DiL) session identifier for a direct link session established between the non-AP station and at least one other non-AP station, and signaling, in the trigger frame, the allocation of the resource unit for the direct link transmission between the non-AP station and other non-AP stations using the DiL session identifier.

9. A method for wireless communication comprising, at a non-access-point (non-AP) station:
   receiving, from an AP, a trigger frame triggering a multi-user (MU) transmission, wherein the trigger frame allocates a resource unit of the MU transmission to another non-AP station in which the other non-AP station can perform, at the other non-AP station's discretion, direct link transmission to the non-AP station or a communication with the AP, wherein the allocated resource unit is signaled, in a signaling field within the trigger frame, with a signaling value different from a value signaling a resource unit in which the other non-AP station can only perform uplink transmission to the AP, and
   receiving a data frame from the other non-AP station over the resource unit allocated,
   wherein the signaling field associated with the resource unit includes an association identifier subfield 12 (AID12 subfield) which, when including an association identifier (AID) assigned to a specific non-AP station during association with the AP allocates the resource unit to the specific non-AP station,
   wherein the signaling value is a reserved AID value set in the AID12 subfield, wherein the signaling field is the User Info field associated with the resource unit according to the IEEE 802.11 family of standards, and wherein a Trigger Dependent User Info subfield of the User Info field comprises an AID of the other non-AP station or an AID of the non-AP station transmitting in the resource unit or both.

10. The method of claim 9, further comprising determining, based on the data frame received, whether the data frame is addressed to the non-AP station or not.

11. A method for wireless communication comprising, at a non-access-point (non-AP) station:

receiving, from an AP, a trigger frame triggering a multi-user (MU) transmission, wherein the trigger frame allocates a resource unit of the MU transmission to the non-AP station in which the non-AP station can perform, at the non-AP station's discretion, direct link transmission to another non-AP station or a communication with the AP, wherein the allocated resource unit is signaled, in a signaling field within the trigger frame, with a signaling value different from a value signaling a resource unit in which the non-AP station can only perform uplink transmission to the AP, and sending a data frame directly to the other non-AP station using the resource unit allocated, wherein the signaling field associated with the resource unit includes an association identifier subfield 12 (AID12 subfield) which, when including an association identifier (AID) assigned to a specific non-AP station during association with the AP allocates the resource unit to the specific non-AP station, wherein the signaling value is a reserved AID value set in the AID12 subfield, wherein the signaling field is the User Info field associated with the resource unit according to the IEEE 802.11 family of standards, and wherein a Trigger Dependent User Info subfield of the User Info field comprises an AID of the other non-AP station or an AID of the non-AP station transmitting in the resource unit or both.

12. The method of claim 11, further comprising, prior to sending the data frame, contending for access to the resource unit allocated by the AP.

13. An access point (AP) in a wireless network comprising:

at least one memory and a microprocessor configured for carrying out the steps of:

generating a trigger frame to trigger a multi-user (MU) transmission, and sending the trigger frame to non-AP stations, wherein the trigger frame allocates a resource unit of the MU transmission to a non-AP station in which the non-AP station can perform, at the non-AP station's discretion, direct link transmission to another non-AP station or a communication with the AP, wherein the allocated resource unit is signaled, in a signaling field within the trigger frame, with a signaling value different from a value signaling a resource unit in which the non-AP station can only perform uplink transmission to the AP, wherein the signaling field associated with the resource unit includes an association identifier subfield 12 (AID12 subfield) which, when including an association identifier (AID) assigned to a specific non-AP station during association with the AP allocates the resource unit to the specific non-AP station, wherein the signaling value is a reserved AID value set in the AID12 subfield, wherein the signaling field is the User Info field associated with the resource unit according to the IEEE 802.11 family of standards, and wherein a Trigger Dependent User Info subfield of the User Info field comprises an AID of the other non-AP station or an AID of the non-AP station transmitting in the resource unit or both.

14. A non-access point (non-AP) station in a wireless network comprising:

at least one memory and a microprocessor configured for carrying out the steps of:

receiving, from an AP, a trigger frame triggering a multi-user (MU) transmission, wherein the trigger frame allocates a resource unit of the MU transmission to another non-AP station in which the other non-AP station can perform, at the other non-AP station's discretion, for direct link transmission to the non-AP station or a communication with the AP, wherein the allocated resource unit is signaled, in a signaling field within the trigger frame, with a signaling value different from a value signaling a resource unit in which the other non-AP station can only perform uplink transmission to the AP, and receiving a data frame from the other non-AP station over the resource unit allocated, wherein the signaling field associated with the resource unit includes an association identifier subfield 12 (AID12 subfield) which, when including an association identifier (AID) assigned to a specific non-AP station during association with the AP allocates the resource unit to the specific non-AP station, wherein the signaling value is a reserved AID value set in the AID12 subfield, wherein the signaling field is the User Info field associated with the resource unit according to the IEEE 802.11 family of standards, and wherein a Trigger Dependent User Info subfield of the User Info field comprises an AID of the other non-AP station or an AID of the non-AP station transmitting in the resource unit or both.

15. A non-access-point (non-AP) station in a wireless network comprising:

at least one memory and a microprocessor configured for carrying out the steps of:

receiving, from an AP, a trigger frame triggering a multi-user (MU) transmission, wherein the trigger frame allocates a resource unit of the MU transmission to the non-AP station in which the non-AP station can perform, at the non-AP station's discretion, direct link transmission to another non-AP station or a communication with the AP, wherein the allocated resource unit is signaled, in a signaling field within the trigger frame, with a signaling value different from a value signaling a resource unit in which the non-AP station can only perform uplink transmission to the AP, and sending a data frame directly to the other non-AP station using the resource unit allocated, wherein the signaling field associated with the resource unit includes an association identifier subfield 12 (AID12 subfield) which, when including an association identifier (AID) assigned to a specific non-AP station during association with the AP allocates the resource unit to the specific non-AP station, wherein the signaling value is a reserved AID value set in the AID12 subfield, wherein the signaling field is the User Info field associated with the resource unit according to the IEEE 802.11 family of standards, and wherein a Trigger Dependent User Info subfield of the User Info field comprises an AID of the other non-AP station or an AID of the non-AP station transmitting in the resource unit or both.

16. A non-transitory computer-readable medium storing a program which, when executed by a microprocessor or computer system in an access point (AP), causes the AP to:

generate a trigger frame to trigger a multi-user (MU) transmission; and send the trigger frame to non-AP stations, wherein the trigger frame allocates a resource unit of the MU transmission to a non-AP station in which the non-AP station can perform, at the non-AP station's discretion, direct link transmission to another non-AP station or a communication with the AP, wherein the allocated resource unit is signaled, in a signaling field within the trigger frame, with a signaling value different from a value signaling a resource unit in which the non-AP station can only perform uplink transmission to the AP, wherein the signaling field associated with the resource unit includes an association identifier subfield 12 (AID12 subfield) which, when including an association identifier (AID) assigned to a specific non-AP station during association with the AP allocates the resource unit to the specific non-AP station, wherein the signaling value is a reserved AID value set in the AID12 subfield, wherein the signaling field is the User Info field associated with the resource unit according to the IEEE 802.11 family of standards, and wherein a Trigger Dependent User Info subfield of the User Info field comprises an AID of the other non-AP station or an AID of the non-AP station transmitting in the resource unit or both.

17. A non-transitory computer-readable medium storing a program which, when executed by a microprocessor or computer system in a non-access-point (non-AP), causes the non-AP to:

receive, from an AP, a trigger frame triggering a multi-user (MU) transmission, wherein the trigger frame allocates a resource unit of the MU transmission to another non-AP station in which the other non-AP station can perform, at the other non-AP station's discretion, direct link transmission to the non-AP station or a communication with the AP, wherein the allocated resource unit is signaled, in a signaling field within the trigger frame, with a signaling value different from a value signaling a resource unit in which the other non-AP station can only perform uplink transmission to the AP, and receive a data frame from the other non-AP station over the resource unit allocated, wherein the signaling field associated with the resource unit includes an association identifier subfield 12 (AID12 subfield) which, when including an association identifier (AID) assigned to a specific non-AP station during association with the AP, allocates the resource unit to the specific non-AP station, wherein the signaling value is a reserved AID value set in the AID12 subfield, wherein the signaling field is the User Info field associated with the resource unit according to the IEEE 802.11 family of standards, and wherein a Trigger Dependent User Info subfield of the User Info field comprises an AID of the other non-AP station or an AID of the non-AP station transmitting in the resource unit or both.

18. A non-transitory computer-readable medium storing a program which, when executed by a microprocessor or computer system in a non-access-point (non-AP), causes the non-AP to:

receive, from an AP, a trigger frame triggering a multi-user (MU) transmission, wherein the trigger frame allocates a resource unit of the MU transmission to the non-AP station in which the non-AP station can perform, at the non-AP station's discretion, direct link transmission to another non-AP station or a communication with the AP, wherein the allocated resource unit is signaled, in a signaling field within the trigger frame, with a signaling value different from a value signaling a resource unit in which the non-AP station can only perform uplink transmission to the AP, and send a data frame directly to the other non-AP station using the resource unit allocated, wherein the signaling field associated with the resource unit includes an association identifier subfield 12 (AID12 subfield) which, when including an association identifier (AID) assigned to a specific non-AP station during association with the AP allocates the resource unit to the specific non-AP station, wherein the signaling value is a reserved AID value set in the AID12 subfield, wherein the signaling field is the User Info field associated with the resource unit according to the IEEE 802.11 family of standards, and wherein a Trigger Dependent User Info subfield of the User Info field comprises an AID of the other non-AP station or an AID of the non-AP station transmitting in the resource unit or both.

19. An access point (AP) in a wireless network comprising:

at least one memory that stores a set of instructions; and at least one processor that executes the instructions, the instructions, when executed, causing the AP to perform operations comprising:

generating a trigger frame to trigger transmission from a non-AP station, and sending the trigger frame, wherein the trigger frame allocates a wireless resource of the transmission to the non-AP station in which the non-AP station can perform, at the non-AP station's discretion, direct link transmission to another non-AP station or a communication with the AP, and wherein the allocated wireless resource is signaled, in a signaling field within the trigger frame, with a signaling value different from a value signaling a wireless resource in which the non-AP station can only perform uplink transmission to the AP, wherein the signaling field associated with the resource unit includes an association identifier subfield 12 (AID12 subfield) which, when including an association identifier (AID) assigned to a specific non-AP station during association with the AP, allocates the resource unit to the specific non-AP station, wherein the signaling value is a reserved AID value set in the AID12 subfield, wherein the signaling field is the User Info field associated with the resource unit according to the IEEE 802.11 family of standards, and wherein a Trigger Dependent User Info subfield of the User Info field comprises an AID of the other non-AP station or an AID of the non-AP station transmitting in the resource unit or both.

20. A non-access point (non-AP) station in a wireless network comprising:
at least one memory that stores a set of instructions; and
at least one processor that executes the instructions, the instructions, when executed, causing the non-AP station to perform operations comprising:
receiving, from an access point (AP), a trigger frame triggering transmission from another non-AP station, wherein the trigger frame allocates a wireless resource of the transmission to the other non-AP station in which the other non-AP station can perform, at the other non-AP station's discretion, for direct link transmission to the non-AP station or a communication with the AP, wherein the allocated wireless resource is signaled, in a signaling field within the trigger frame, with a signaling value different from a value signaling a wireless resource in which the other non-AP station can only perform uplink transmission to the AP, and
receiving a data frame from the other non-AP station over the allocated wireless resource,
wherein the signaling field associated with the resource unit includes an association identifier subfield 12 (AID12 subfield) which, when including an association identifier (AID) assigned to a specific non-AP station during association with the AP, allocates the resource unit to the specific non-AP station,
wherein the signaling value is a reserved AID value set in the AID12 subfield,
wherein the signaling field is the User Info field associated with the resource unit according to the IEEE 802.11 family of standards, and
wherein a Trigger Dependent User Info subfield of the User Info field comprises an AID of the other non-AP station or an AID of the non-AP station transmitting in the resource unit or both.

21. A non-access-point (non-AP) station in a wireless network comprising:
at least one memory that stores a set of instructions; and
at least one processor that executes the instructions, the instructions, when executed, causing the non-AP station to perform operations comprising:
receiving, from an access point (AP), a trigger frame triggering transmission from the non-AP station, wherein the trigger frame allocates a wireless resource of the transmission to the non-AP station in which the non-AP station can perform, at the non-AP station's discretion, direct link transmission to another non-AP station or a communication with the AP, wherein the allocated wireless resource is signaled, in a signaling field within the trigger frame, with a signaling value different from a value signaling a wireless resource in which the non-AP station can only perform uplink transmission to the AP, and
transmitting a data frame directly to the other non-AP station using the allocated wireless resource,
wherein the signaling field associated with the resource unit includes an association identifier subfield 12 (AID12 subfield) which, when including an association identifier (AID) assigned to a specific non-AP station during association with the AP allocates the resource unit to the specific non-AP station,
wherein the signaling value is a reserved AID value set in the AID12 subfield,
wherein the signaling field is the User Info field associated with the resource unit according to the IEEE 802.11 family of standards, and
wherein a Trigger Dependent User Info subfield of the User Info field comprises an AID of the other non-AP station or an AID of the non-AP station transmitting in the resource unit or both.

22. The non-AP station according to claim 21, wherein the operations further comprise choosing a target other non-AP station for direct link transmission,
wherein, in the transmitting, the data frame is directly transmitted to the target other non-AP station.

* * * * *